Jan. 23, 1934.   W. A. MULHERN   1,944,261
BRAKE DRUM
Filed July 29, 1931
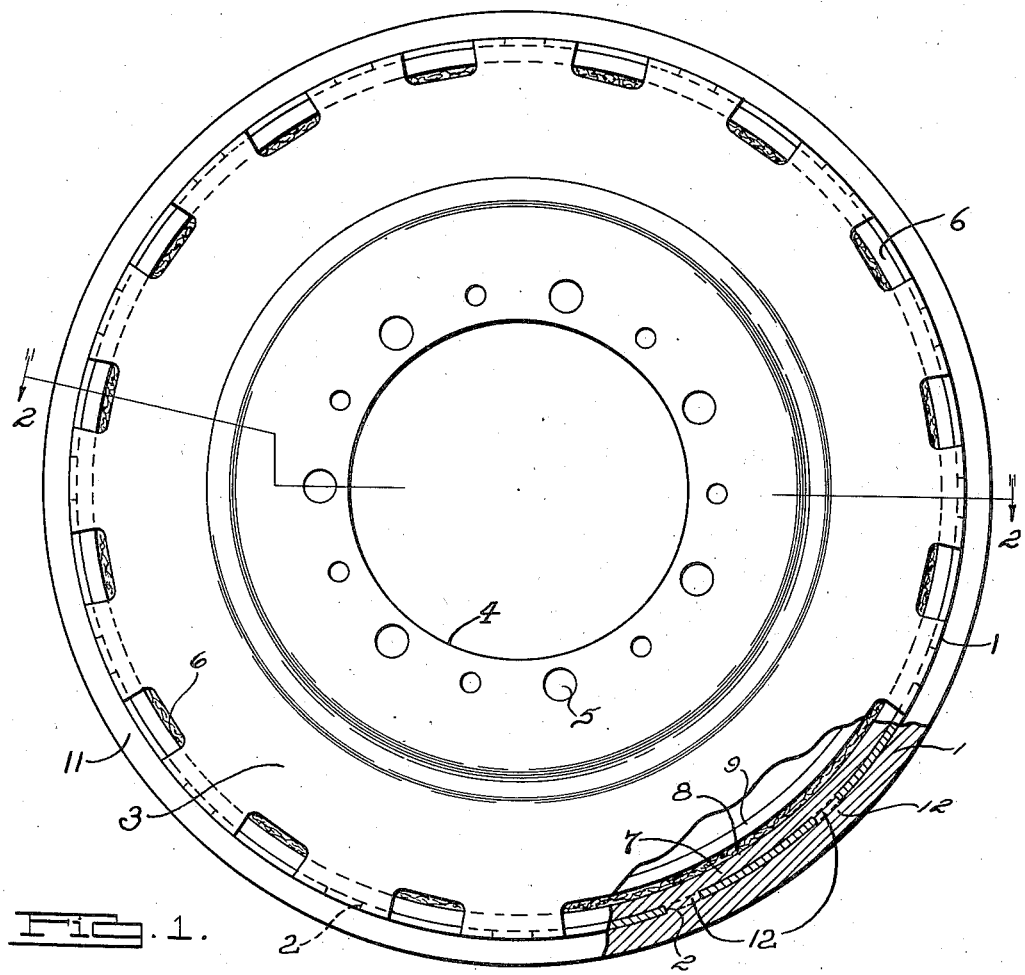
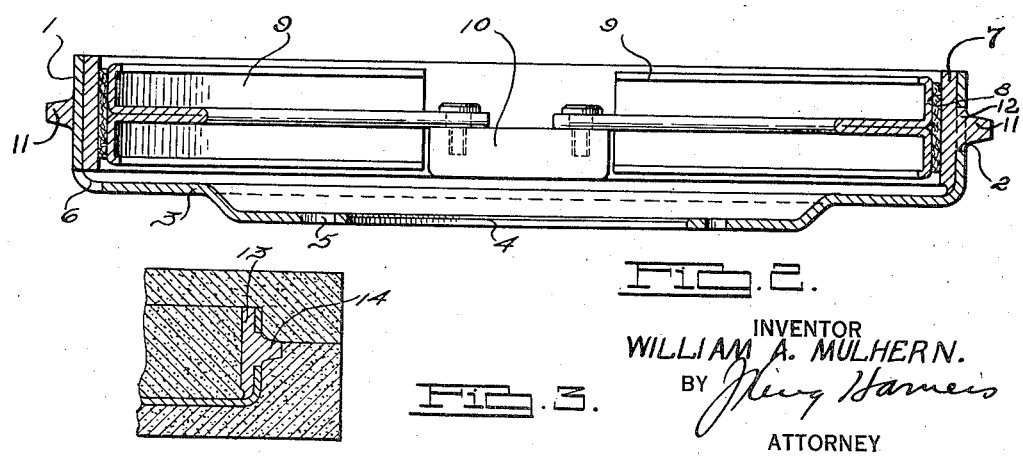
INVENTOR
WILLIAM A. MULHERN.
BY
ATTORNEY Patented Jan. 23, 1934

1,944,261

UNITED STATES PATENT OFFICE 1,944,261

BRAKE DRUM

William A. Mulhern, Detroit, Mich., assignor to Chrysler Corporation, Detroit, Mich., a corporation of Delaware Application July 29, 1931. Serial No. 553,769

5 Claims. (Cl. 188—218)

This invention relates to an improved brake drum.

The main objects of the invention are to provide a drum of this kind which has an integral inner lining and outer web portion; to provide an inner lining and outer web structure having integral connecting portions extending through apertures in the cylindrical part of the drum; to provide a brake drum having a cast iron inner lining, cast integral with an external web and integrally joined with the latter through apertures in said drum; to provide an improved method for rigidly fixing an internal lining element and external web on a brake drum; and to provide apertures in those portions of a brake drum wherein heat is concentrated during braking operations for permitting the escapement of heated air.

An illustrated embodiment of the invention is shown in the accompanying drawing, in which:

Fig. 1 is a side elevation, partly in section, of a drum which embodies my invention.

Fig. 2 is a transverse section taken on the line 2—2 of Fig. 1.

Fig. 3 is a fragmentary section illustrating diagrammatically one way in which the internal lining and external web may be integrally cast upon the inner portion of the brake drum.

In the form shown, the brake drum is preferably formed of sheet steel by a die stamping operation and it includes a cylindrical part 1 having apertures 2 extending through its intermediate portion, and a side wall 3 which is provided with a central opening 4 for receiving a hub structure of a wheel. Formed in the inner portion of the side wall 3 are apertures 5 through which bolts, not shown, are extended for rigidly securing the drum to the wheel. Spaced apertures, or slots 6 are provided in the drum at the junction of the side wall 3 and cylindrical portions 1 for permitting air which is heated during braking operations to escape from the interior of the drum.

The inner periphery of the drum is provided with a continuous lining 7 having a cylindrical surface 8 against which brake shoes 9 operate. The brake shoes 9 are pivotally mounted on a lug 10 that is carried by the axle of the wheel with which the brake drum is associated and they are adapted to be urged outwardly by conventional brake actuating apparatus (not shown). Surrounding the outer periphery of the cylindrical portion 1 of the drum is a radially extending flange or web 11 which is integrally connected with the lining 7 by metal necks 12 which extend through the apertures 2.

The inner lining and outer web are preferably formed of cast iron and they are simultaneously cast upon the cylindrical portion of the drum in any conventional manner. This simultaneous casting of the inner lining and outer web may be performed by placing the die cast sheet steel drum in a mold of the type illustrated in Fig. 3 which is provided with an annular chamber 13 adjacent the inner periphery in the cylindrical portion of the drum and an annular chamber 14 adjacent the outer periphery of the cylindrical portion 1. The annular chambers 13 and 14 communicate with each other through the openings 2 in the cylindrical part of the drum which permit integral fusion of the molten metal that is introduced into the inner annular chamber 13 with the molten metal introduced into the outer annular chamber 14. The molten metal may be poured into either one of the chambers and then allowed to flow into the other chamber, or it may be poured directly into both chambers.

The outer web 11 dissipates the heat which is created in the drum during braking operations into the atmosphere and the integral necks 12 between the inner lining and the outer web provide efficient conduction of heat from the inner lining to the web.

Although but one specific embodiment of this invention has herein been shown and described, it will be understood that various changes in the size, shape and arrangement of parts may be made without departing from the spirit of my invention and it is not my intention to limit its scope other than by the terms of the appended claims.

What I claim is:

1. A brake drum including a cylindrical portion, and an integral metal lining and web on the inner and outer peripheries of said cylindrical portions respectively.

2. A brake drum including a cylindrical portion having spaced openings therethrough, and an integral metal lining and web on the inner and outer peripheries of said cylindrical portion respectively having common parts extending through said openings.

3. A brake drum including a cylindrical portion having spaced openings therethrough, a lining comprising cast metal on the inner periphery of said cylindrical portion, a continuous web on the outer periphery of said cylindrical portion comprising cast metal, and cast metal extending through said openings and integral with the metal of said lining and web.

4. A brake drum including a cylindrical portion having apertures therein and a side portion having apertures at the junction of the latter and said cylindrical portions, the latter apertures being open for permitting escapement of heated air, and a lining and web on the inner and outer peripheries of said cylindrical portion respectively having connecting elements extending through the apertures of said cylindrical portion for conducting heat from said lining to said web.

5. A brake drum including a cylindrical portion having apertures therein and a side portion having apertures at the junction of the latter and said cylindrical portions, the latter apertures being open for permitting escapement of heated air, and a lining and web comprising cast iron on the liner and outer peripheries of said cylindrical portion having portions extending through the apertures of said cylindrical portion integral with both said lining and said web for conducting heat from said lining to said web.

WILLIAM A. MULHERN.